United States Patent Office 3,322,593
Patented May 30, 1967

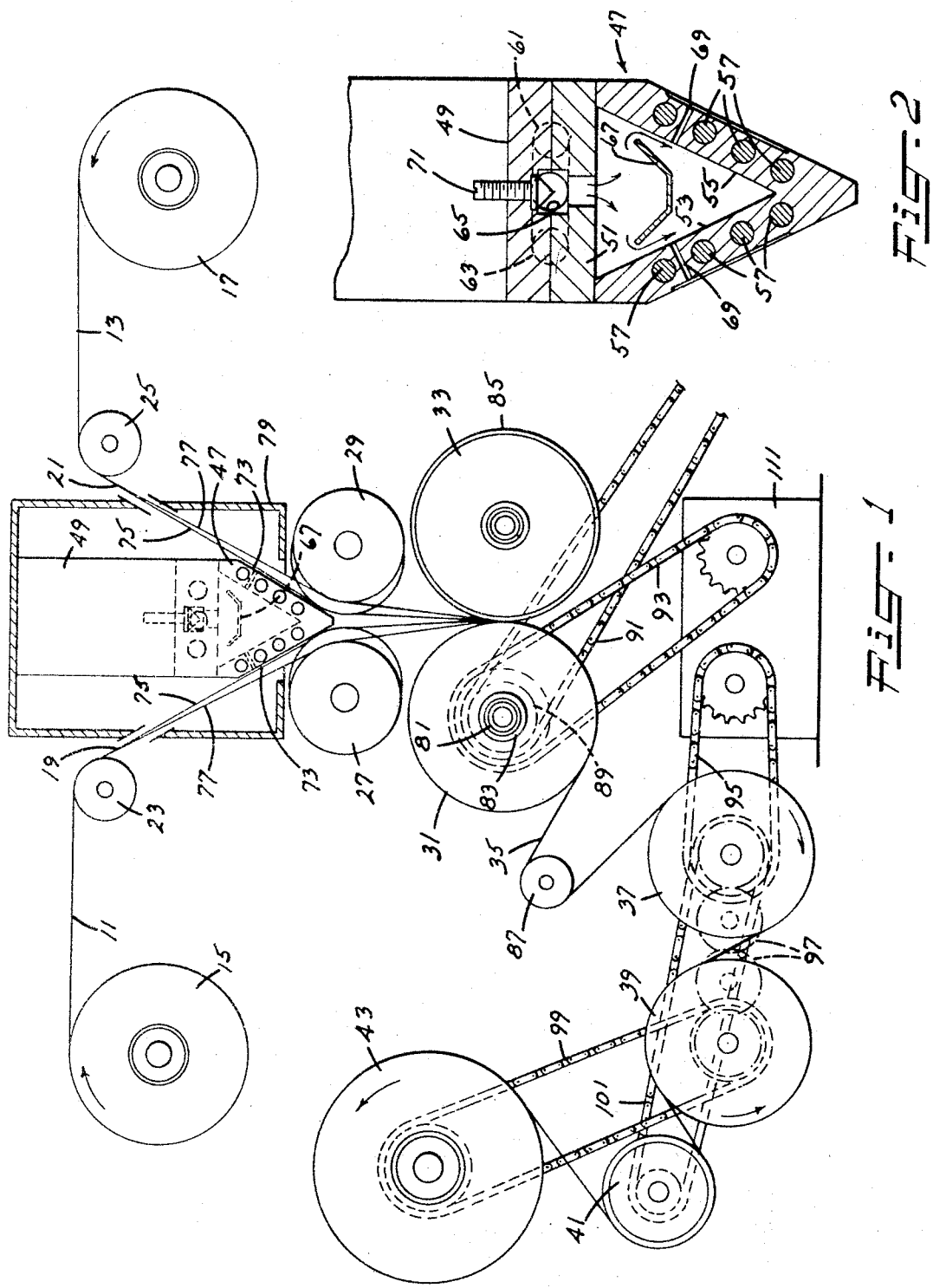

3,322,593
METHOD AND APPARATUS FOR LAMINATING FILMS
John D. Conti, Elkins Park, Pa., assignor to FMC Corporation, Philadelphia, Pa., a corporation of Delaware
Filed Oct. 8, 1965, Ser. No. 498,201
9 Claims. (Cl. 156—307)

ABSTRACT OF THE DISCLOSURE

Method and apparatus in which traveling hydrophilic sheet materials, at least one of which has a coating of thermoplastic material, are heated to soften the thermoplastic material and simultaneously humidified by moist steam, pressed together and then cooled, to provide a composite product.

This application is a continuation-in-part of application Ser. No. 326,734, now abandoned.

This invention relates to the production of composite articles, and more particularly to an improved method and apparatus for laminating water-insoluble hydrophilic sheet materials.

In accordance with conventional procedures, hydrophilic sheet materials which are to be laminated are coated on at least one of the opposing sides thereof with a thermoplastic material and then combined, generally by being passed between pressure rollers. The sheet materials may be coated, for example, by known solvent coating or melt extrusion procedures, and may be combined before or after the applied thermoplastic material has set. In the latter instance the pressure rollers are heated to again render the applied coating tacky as the sheet materials are pressed therebetween.

A significant disadvantage of these known procedures is that the heat applied to the hydrophilic sheet materials during the coating and/or laminating operations causes considerable moisture to escape from the sheet materials. Humidification of the resulting laminated product may render it suitable for its intended uses. However, such humidifying operations are generally slow and costly and are often unsatisfactory especially when apreciable quantities of moisture must be restored into the product. Accordingly, a primary object of this invention is to provide a generally new or improved and more satisfactory method and apparatus for laminating hydrophilic sheet materials.

Another object of the invention is to provide an improved method and apparatus for rapidly humidifying and laminating hydrophilic sheet materials.

Still another object of the invention is the provision of an improved method and apparatus for rapidly introducing large quantities of moisture into coated hydrophilic sheet materials concomitantly with the lamination thereof.

Still further objects will appear from the following description.

These objects are accomplished in accordance with the present invention by a method and apparatus wherein at least two hydrophilic sheet materials or films are heated and humidified after which the sheet material are pressed together to thereby provide a composite or laminated product. The sheet materials to be laminated in accordance with the present invention are provided with a coating of thermoplastic material on at least one side of each pair of opposing sides thereof, such coating being adapted to be heated to a temperature of at least 212° F. without undergoing substantial flow.

Humidification of the sheet materials is effected by impinging the same with moist steam and is achieved concomitantly with the heating of at least one of the sheet materials to soften the thermoplastic coating thereon. More particularly, one and preferably both of the opposing sides of the sheet materials are heated and humidified as they are advanced relative to and in spaced relationship with the walls of a hollow shoe which is maintained at a substantially uniform elevated temperature. Moist steam is delivered into the shoe under pressure and is discharged therefrom and against the sheet materials through elongated slots formed in the walls thereof. The heated shoe is preferably of generally triangular shape so that the sheet materials can assume converging paths during the heating thereof and be rapidly engaged with each other after moving beyond the shoe.

The sheet materials which are to be laminated are preferably made taut or stretched laterally during the humidification thereof and until they are pressed together. This lateral stretching may be and preferably is achieved by conventional curved spreader rolls and serves to remove wrinkles and folds from the sheet materials immediately prior to laminating of the same.

The sheet materials are pressed together after being removed from the humidifying atmosphere and while held in a taut or laterally stretched condition. During the pressing thereof, the sheet materials are maintained heated to a temperature of from 200° to 212° F. but not greater than that to which they were originally heated. Under these temperature conditions, the entrapment of droplets of condensed steam between the sheet materials is avoided and there is no danger of damage to or possible flow of the thermoplastic coating material as the sheets are pressed or laminated together. The laminated product which is produced by combining the heated and humidified sheet materials together is immediately cooled to room temperature to avoid the loss of moisture and is then collected.

Concomitantly heating and humidifying the sheet material permits the same to ripidly assume and retain relatively large quantities of moisture. Moreover, the heated sheet materials may be pressed or laminated together immediately after the humidification thereof is completed so that little opportunity is provided during which moisture may escape from the sheet materials. The method of the present invention not only facilitates high speed humidifying and laminating operations but provides a composite product which contains far more moisture than could be imparted thereto by conventional procedures. Additionally, and especially important when solvent coated sheet materials are being laminated, the method of the present invention provides for substantially complete removal of all residual traces of solvents so that the resulting composite product is well adapted for use with food products and exhibits good performance on packaging and heat-sealing equipment.

The laminating method of the present invention is not limited to any particular water-insoluble hydrophilic sheet materials. The sheet materials may be coated with any suitable thermoplastic material which exhibits no substantial flow when heated to a temperature of about 212° F. One or both of the opposing sides of the sheet materials which are to be laminated may be provided with a coating of thermoplastic material and, if desired, the sheet materials may be each coated on their opposing sides with the same or different thermoplastic materials. The hydrophilic sheet materials which are to be laminated may be in the form of individual sheets, or continuous films, webs, bands, ribbons and the like.

For the sake of clarity and simplicity, the method and apparatus of the present invention are hereafter described as applied to laminating of continuous transparent films formed from viscose, which is commonly known as cellophane, and which are provided with a vinyl coating on at least each of the opposing sides thereof. More specifically, the thermoplastic coating material is selected from the group consisting of polyolefins having molecular weights of from 10,000 to 100,000 and densities in g./cc. of from 0.88 to 0.97 and interpolymers containing 50 to 95% by weight of vinylidene chloride, as more fully described in United States Patent 3,037,868. The thermoplastic material may be applied onto the regenerated cellulose films by melt extrusion procedures, which is preferred in the case of polyolefin coatings, or from a lacquer or emulsion, as is preferred when vinylidene chloride interpolymers are employed. In view of the rapid and extensive humidification which is effected during the method of the present invention, humidification of the individual regenerated cellulose films to restore moisture which had been lost during the coating operation is neither necessary nor particularly desired.

In the drawing, FIGURE 1 is an end view of the apparatus of the present invention;

FIGURE 2 is a vertical section taken through a heated shoe employed in the apparatus shown in FIGURE 1;

Figure 3:
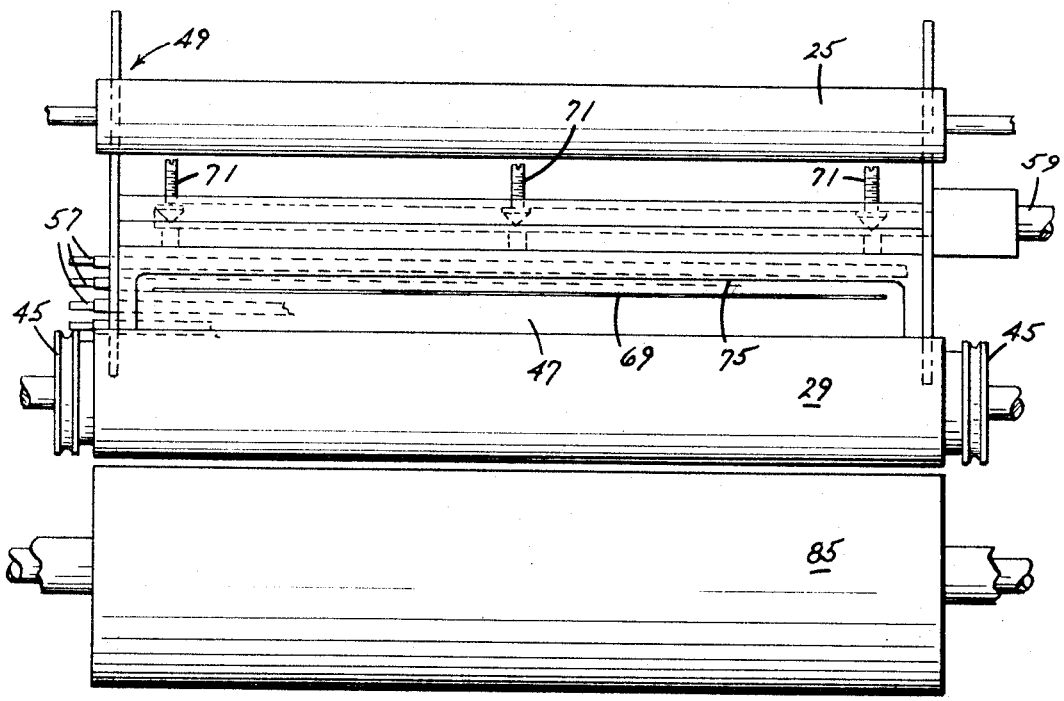
FIGURE 3 is a side view of the apparatus shown in FIGURE 1.
Figure 4:
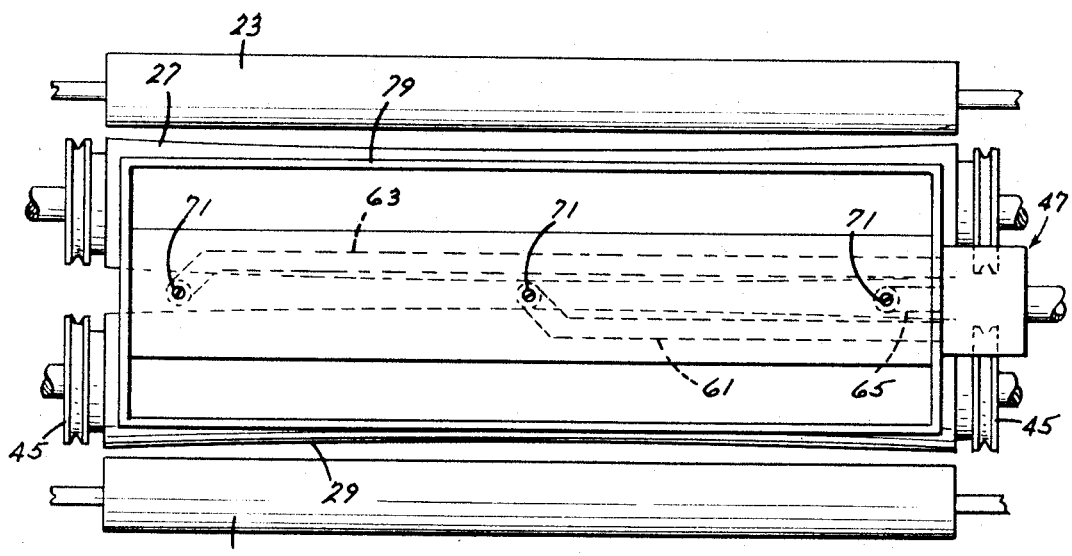
FIGURE 4 is a top view of the apparatus shown in FIGURE 3.

Referring now to FIGURE 1 of the drawing, transparent regenerated cellulose films which are to be laminated are indicated at 11 and 13 and are supplied from separate rolls 15 and 17 with their coated sides 19 and 21 disposed in opposing relationship. These films are laced about guide rolls 23 and 25, engaged with curved or bowed spreader rolls 27 and 29 and then brought together and laminated by temperature and pressure rollers 31 and 33, respectively. The resulting composite or laminated product, indicated at 35, is cooled to at least room temperature by chill rollers 37 and 39, passed about a rubber covered gripping or pull roll 41 and then collected in the form of a roll, as shown at 43.

The rolls 23 and 25 are idler rolls which are driven by the movement of the films 11 and 13. The spreader rolls 27 and 29, however, are together driven through pulleys 45 from a suitable source, not shown, to positively advance the films at a uniform rate of speed. In traveling from the guide rolls 23 and 25 to the spreader rolls 27 and 29, the opposing coated sides of the films 11 and 13 are softened by a heated shoe 47 which is fixed to a support frame 49. As best shown in FIGURE 2 the shoe 47 is of hollow construction and includes a top wall 51 and tapered or inclined side walls 53 and 55. Electrical heating elements 57 are embedded within the tapered walls of the shoe 47 and serve to maintain the same heated at a desired elevated temperature.

Humidification of the films 11 and 13 is effected concomitantly with the heating thereof by moist steam which is impinged against the opposing sides thereof. More specifically, a pipe 59 supplies moist steam under pressure to conduits 61, 63 and 65 which in turn open into the hollow shoe. A deflector 67 serves to distribute the delivered moist steam along the length of the shoe 47 and cause the same to sweep along the inside surfaces of the side walls 53 and 55. The moist steam is discharged from the shoe 47 through elongated slots 69 which extend across the entire width of the films 11 and 13.

It will be noted that the conduits 61, 63 and 65 initially deliver the moist steam into the opposite ends and center of the hollow shoe 47 so as to avoid substantial pressure differentials along the length thereof. If necessary, the steam flow within the individual conduits 61, 63 and 65 may also be varied by adjustment of valves 71. Within the shoe itself, the incoming streams of moist steam are blended together as they are distributed by the deflector 67 so that differences in steam pressure are equalized along the length of the shoe. Of particular importance is that the moist steam must be discharged from the shoe 47 through continuous elongated slots, as indicated at 69, to provide for uniform humidification across the width of the individual films. Discharge openings of non-uniform size or the use of a series of closely spaced openings should be avoided since such arrangements effect non-uniform humidification or humidification of the film only at transversely spaced areas.

The number of slots 69 formed in the respective side walls 53 and 55 of the shoe may be varied and if desired additives, such as softeners, coloring matter, etc. may be incorporated into the moist steam before or as it is being delivered into the shoe 47. As the films 11 and 13 are advanced relative to the shoe 47 their central portions, indicated at 75, are bowed relative to the film edges, indicated at 77, by the curved rolls 27 and 29 to thus spread and remove wrinkles from such films. If desired, the atmosphere about shoe 47 may be isolated from the remaining atmosphere by a hood as illustrated at 79.

The temperature to which the shoe 47 is heated will, of course, vary with such factors as the nature of the films being laminated, the particular thermoplastic coating materials, the speed of the films, etc. The heat supplied by the shoe must be such as to render the film coatings in a softened condition without causing the same to flow and must have a temperature of at least 212° F. to avoid condensation of the moist steam between the films before they are engaged and laminated to each other. The films should be directed close to the tapered sides of the shoe 47 and, as heretofore mentioned, will travel along paths which are indicated at 75 and 77 as the spreader rolls 27 and 29 are turned. It is preferred that the films 11 and 13 be kept spaced from the sides of the shoe 47 at all times to avoid damage and possible destruction of the coated sides thereof.

The curved spreader rolls 27 and 29 are of conventional construction and, as heretofore mentioned, serve to remove wrinkles and folds from the humidified films by stretching the same laterally. As will be apparent from FIGURE 1 of the drawing, the rolls 27 and 29 maintain the films 11 and 13 in laterally spread conditions until they are pressed together by the temperature and pressure rollers.

The temperature roller 31 is of known steel construction and is maintained heated by a hot fluid circulated through the interior thereof by conduits 81 and 83. Preferably, the roller 31 is heated to a temperature of from 200° to 212° F. but not greater than the softening temperature range of the thermoplastic material forming the film coatings. When kept at such temperature, condensation of the moist steam on the roller surface is prevented and proper bonding of the softened coated surfaces of the films is assured. The cooperating pressure roller 33 is also of conventional construction and includes an outer cover 85 of silicone rubber or other heat-resistant resilient materials.

The laminated product 35 which issues from between the rollers 31 and 33 is rapidly cooled by chill rolls 37 and 39. As illustrated, the laminated product 35 is wrapped about a substantial portion of the chill roll 37 by an idler roll 87 to provide for rapid and extensive cooling thereof. The chill rolls 37 and 39 are of conventional steel construction through which refrigerated water or other cool liquids may be circulated. Upon leaving the chill roll 37, the laminated product 35 is passed about the rubber-covered gripping or pull roll 41 and is then collected as a roll, as shown at 43.

To facilitate continuous advancement of the films 11 and 13 through the apparatus, as described, a sprocket 89 is fixed to one end of the temperature roller 31 and is driven by a chain 91 directly from a motor, not shown. A speed controller 111 is driven from the roller 31 by a chain 93 and in turn serves to drive the chill roll 37 by means of a chain 95. A train of gears 97 serves to transmit rotary motion from the roll 37 to the roll 39, the latter of which serves to drive the take-up roller 43 through a chain 99. By means of a chain 101, the chill roll 37 serves also to drive the rubber-covered pull roll 41.

The following example is provided to further illustrate the method of the present invention.

Conventional transparent regenerated cellulose films, each being coated on one side with a copolymer of vinylidene chloride and vinyl chloride (Saran), were together laced through the described laminating apparatus in the manner as illustrated and with their coated sides in opposing relationship. The apparatus was set in operation and the speed of the different drive members was gradually increased until the films were traveling at the rate of approximately 600 feet per minute. During this period, the electric elements 57 heated and maintained the shoe 47 at a temperature within the range of from 250° to 275° F., the temperature roll was maintained at a temperature of between 200° and 212° F. As these desired temperature conditions were approached, moist steam at a temperature of slightly more than 212° F. was admitted into the shoe 47 under a pressure of about 10 pounds per square inch.

As the films moved past the shoe 47, the surfaces of the coated sides thereof were rendered tacky or soft and were snugly pressed together as the films traveled inbetween the temperature and pressure rollers 31 and 33. The resulting laminated product was rapidly cooled by rolls 37 and 39 which were kept at a temperature of about 60° F. by circulating refrigerated water therethrough. The laminated product exhibited a uniform, strong and continuous bond between the films, with no haze or loss in film clarity being apparent. Actually, striations which existed along the coated sides of the individual films appeared to disappear during the softening of such coated sides and were no longer apparent in the resulting laminated product. The moisture content of the laminated product was about 6.0%, by weight. It was found that products having moisture contents as high as 11%, by weight, could be produced by advancing the films at a slower rate of speed and, of course, using lower temperatures than those maintained above. Further, it was noted that all traces of solvents were removed from the films during the humidifying and laminating operations.

Figure 5:
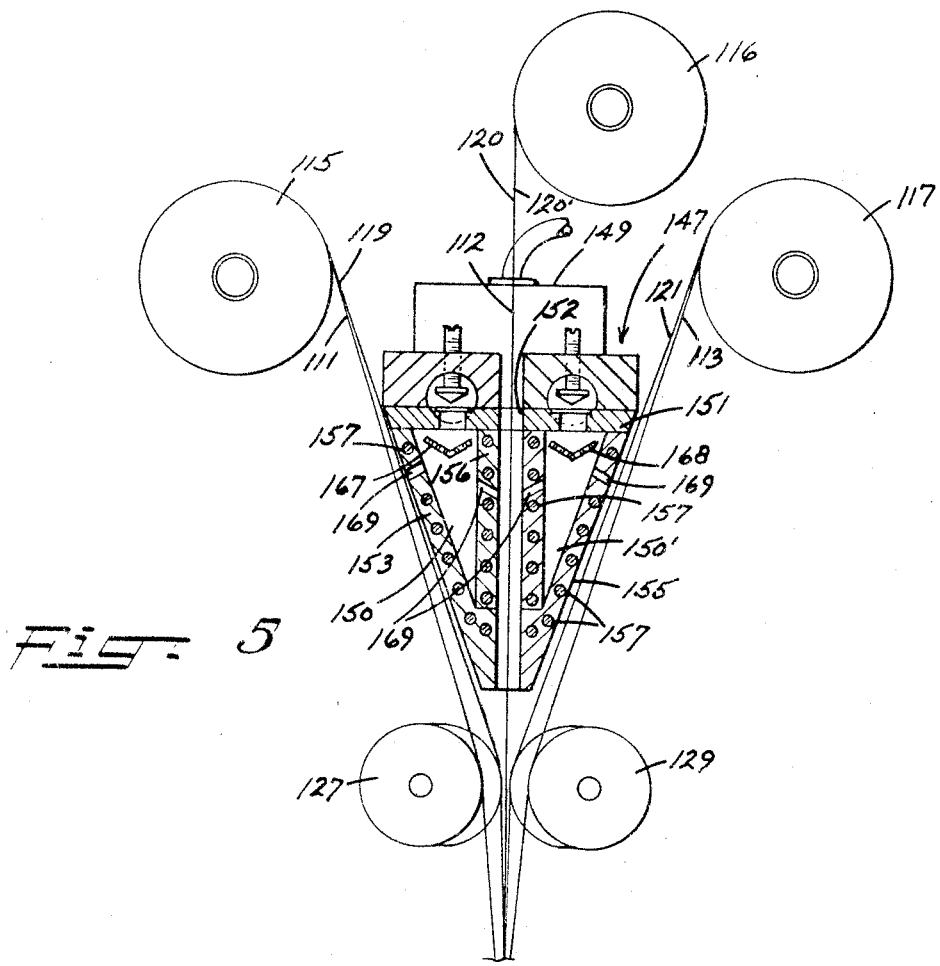
FIGURE 5 is a view similar to FIGURE 2 illustrating a modified heated shoe construction.
Figure 6:
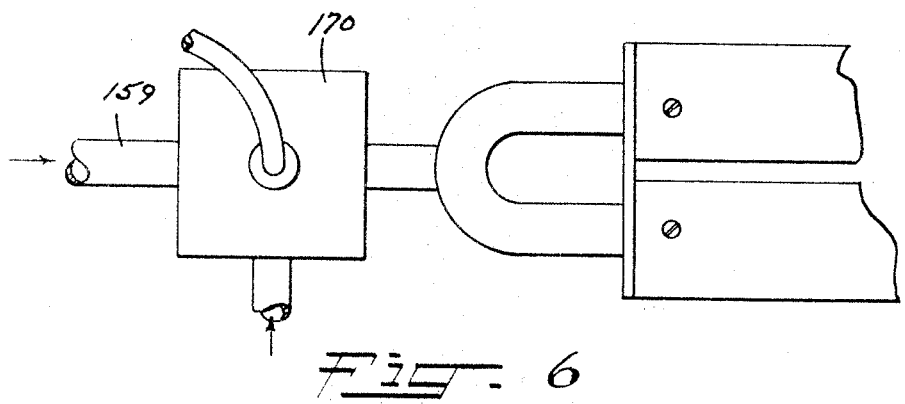
FIGURE 6 is a partial top view of the construction shown in FIGURE 5.

The modified heated shoe 147 shown in FIGURES 5 and 6 is designed for use in laminating three films 111, 112 and 113 in accordance with the method of the present invention and in much the same manner as heretofore described. The shoe 147 is supported by a fixed frame 149 and differs from the shoe 47 heretofore described by including a pair of chambers 150 and 150'. These chambers 150 and 150' have a common top wall 151 formed with an elongated slot 152 and outside tapered or inclined side walls 153 and 155. Partition walls 156 and 156' are aligned with the slot 152 to provide a continuous passage through the shoe 147. Electrical heating elements 157 are embedded within the walls 153, 155 and 156 of the shoe 147 and serve to maintain the same heated to a desired elevated temperature.

The films 111, 112 and 113 are supplied from separate rolls 115, 116 and 117 with their coated sides 119, 120, 120' and 121 disposed in opposing relationship. It will, of course, be apparent that all opposing sides of the films 111, 112 and 113 need not include a surface formed of thermoplastic material but that at least one side of each pair of opposing sides of the films present a surface of thermoplastic material. As with films 11 and 13, the films 111, 112 and 113 are concomitantly heated and humidified as they are advanced relative to the shoe 147, stretched laterally by conventional curved spreader rolls 127 and 129, combined into a laminated product in the same manner as heretofore described with reference to FIGURE 1.

As with the shoe 47, moist steam is delivered by a pipe 159 to a plurality of conduits, such as conduits 61, 63 and 65 in the shoe 47, which in turn open into chambers 150 and 150'. Deflectors 167 and 168 serve to distribute the delivered moist steam along the shoe 147 and cause the same to sweep along the inside surfaces of the walls 153, 155, 156 and 156'. The moist steam is discharged through elongated slots 169 which extend across the entire width of the films 111, 112, and 113. If desired, additives such as softeners, colorants, etc. may be dispersed within the steam by a suitable atomizer shown at 170.

As heretofore mentioned, except for accommodation of an additional film the shoes 47 and 147 operate in substantially the same manner. When more than three films are to be laminated two or more individual heated shoes 47 may be employed or a multi-chamber shoe constructed along the lines of the shoe 147 may be used.

It is to be understood that changes and variations may be made without departing from the spirit and scope of the invention as defined in the appended claims.

I claim:

1. A method of laminating a pair of continuous films formed of non-fibrous cellulosic materials and having a substantially dry coating of thermoplastic material on at least one side of the opposing sides thereof including the steps of continuously advancing the films relative to and in spaced relationship with the opposite sides of a stationary member which is heated to within the softening temperature of the thermoplastic material forming the coating on such one side thereof, impinging moist steam directly against the opposing sides of the continuously advancing films concomitantly with the heating thereof to thereby rapidly humidify the same, pressing the films together while maintaining the same at a temperature not greater than that to which they are originally heated to thereby provide a composite product and cooling the composite product.

2. A method as defined in claim 1 further including the step of laterally spreading the humidified films to remove all wrinkles therefrom immediately prior to and during the pressing thereof.

3. A method of laminating a pair of continuous non-fibrous cellulosic films having a substantially dry coating of thermoplastic material on opposing sides thereof which includes the steps of disposing the films in spaced apart relationship and continuously advancing the same relative to but spaced from the opposite sides of a member which is heated to a temperature of at least 212° F. and within the softening range of the thermoplastic material forming the coating thereof, impinging moist steam under pressure directly against the opposing sides of the advancing films to rapidly humidify the same concomitantly with the heating thereof, pressing the advancing films together after they have been removed from the hot and humidified atmosphere and while the coatings thereon are still in a softened condition to thereby laminate the same, maintaining the films heated to a temperature of at least 200° F. and not greater than the temperature to which they were originally heated while they are being pressed together, and thereafter cooling the laminated product.

4. A method as defined in claim 3 wherein the films are formed of regenerated cellulose and wherein the coating comprises materials from the group consisting of polyolefins having molecular weights of from 10,000 to 100,000 and densities in g./cc. of 0.88 and 0.97 and interpolymers containing 50 to 95% by weight of vinylidene chloride.

5. Apparatus for humidifying and laminating at least two non-fibrous, hydrophilic cellulosic sheet materials in which at least one side of each pair of opposing sides thereof is formed of thermoplastic material comprising means including a hollow member for heating at least one side of each pair of opposing sides of the sheet materials to soften the thermoplastic material thereon, means for advancing the sheet materials relative to said heating means, means for impinging moist steam against at least one side of each pair of opposing sides of the sheet materials simultaneously with the heating thereof, means for laterally spreading the moistened and heated sheet materials to remove wrinkles therefrom, means for pressing the heated sheet materials together while they are in laterally spread condition to provide a composite product, and means for cooling the composite product.

6. Apparatus as defined in claim 5 wherein said means for impinging moist steam against at least one side of each pair of opposing sides of the sheet materials includes means for delivering moist steam into the hollow member and a continuous elongated slot formed in said hollow member for discharging the moist steam therefrom.

7. Apparatus as defined in claim 6 wherein the moist steam is delivered into the hollow member at the opposite ends and center thereof.

8. Apparatus as defined in claim 6 further including spaced walls partitioning said hollow member into at least two chambers between which a non-fibrous hydrophilic cellulosic sheet material is adapted to travel and an elongated slot formed in at least one of said spaced walls for discharging moist steam from said hollow member and against a sheet material as it advanced between said chambers.

9. Apparatus as defined in claim 5 wherein said spreading means includes a pair of curved rolls for spreading the sheet materials laterally as they are advanced beyond the hollow member and wherein said hollow member is of generally triangular shape and is positioned so that one corner thereof is located between said curved rolls.

References Cited

UNITED STATES PATENTS 3,210,227  10/1965  Shichman    156—82
3,230,125  1/1966  Hicks    156—229
3,262,829  7/1966  Conti    156—307

EARL M. BERGERT, *Primary Examiner.*

M. L. KATZ, *Assistant Examiner.*